April 5, 1949.　　　　B. E. HOUSE ET AL　　　　2,466,425
PRESSURE FLUID BRAKE MOTOR

Filed April 18, 1946　　　　　　　　　　　2 Sheets-Sheet 1

INVENTOR.
BRYAN E. HOUSE
RUDOLPH A. GOEPFRICH
BY
T. J. Plante
ATTORNEY

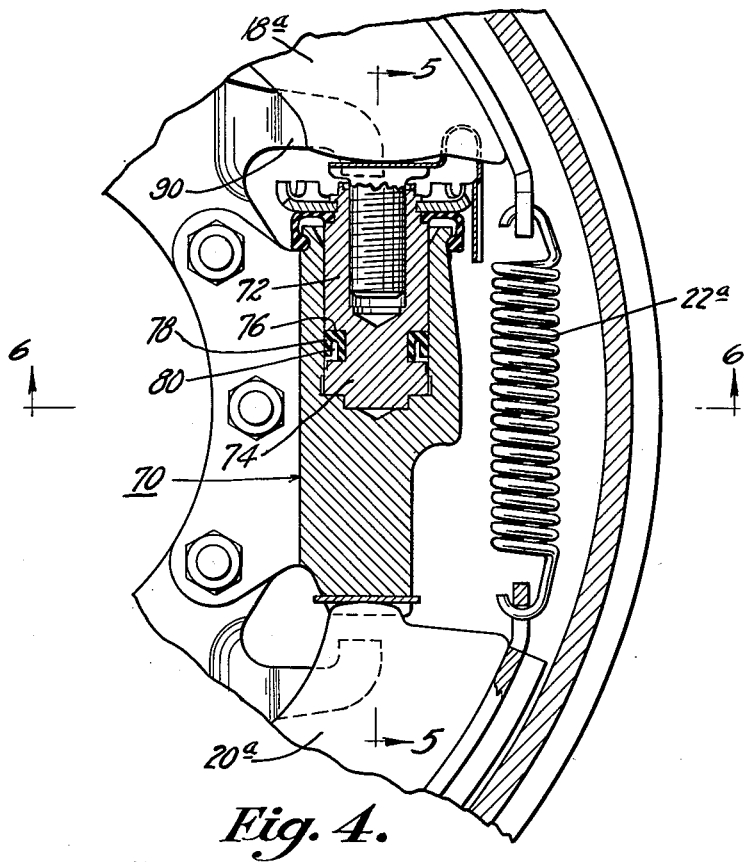
Fig. 4.
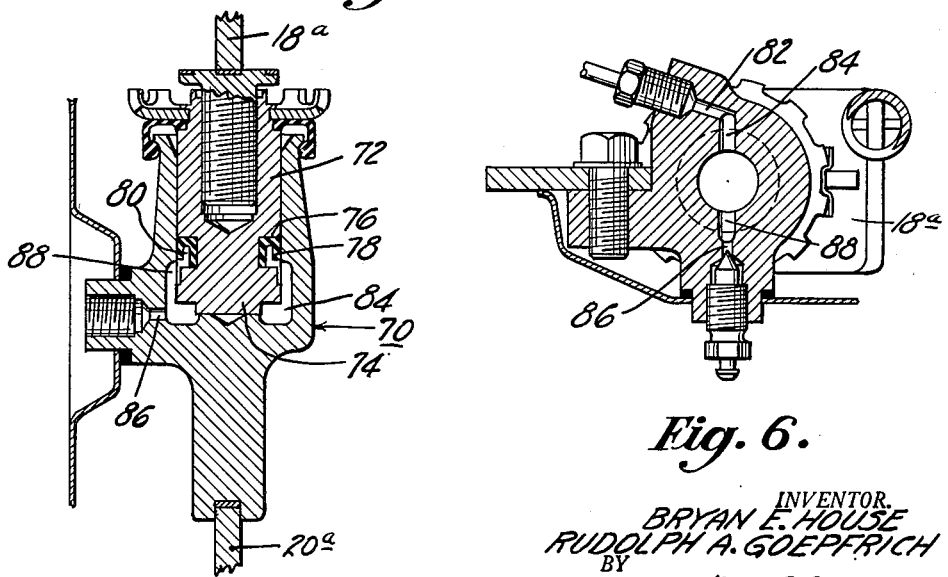
Fig. 5.
Fig. 6.

Patented Apr. 5, 1949

2,466,425

UNITED STATES PATENT OFFICE 2,466,425

PRESSURE FLUID BRAKE MOTOR

Bryan E. House and Rudolph A. Goepfrich, South Bend, Ind., assignors to Bendix Aviation Corporation, South Bend, Ind., a corporation of Delaware Application April 18, 1946, Serial No. 663,085

6 Claims. (Cl. 60—54.6)

This invention relates to pressure fluid brake motors, intended to be used in hydraulically actuated braking systems.

The primary object of this invention is to provide hydraulic brake act 1ating mechanism which is so constructed and arranged as to improve the efficiency of the bleeding operation whereby entrained air is removed from the hydraulic pressure system.

Difficulty in effectively bleeding hydraulic motors or wheel cylinders has resulted from the presence of annular seal-containing grooves in the outer cylindrical surfaces of the pistons, spaced from the inner or forward ends of the pistons. These grooves in which a double-lipped annular sealing member is positioned, provide pockets from which it is difficult to drive accumulated air during the bleeding operation. The liquid which is forced through for the purpose of removing the air bubbles tends to pass directly from inlet to outlet across the faces of the pistons, without greatly disturbing the fluid accumulated in the axially spaced annular grooves.

From the foregoing, it follows that an object of the present invention is to improve the effectiveness of the bleeding operation, when applied to a cylinder in which an annular seal-containing groove is axially spaced from the inlet and outlet ports of the cylinder.

A feature of the invention is the provision of means for preventing excessive loss of fluid from the wheel cylinders in case of breakage of the brake drum.

Figure 1:
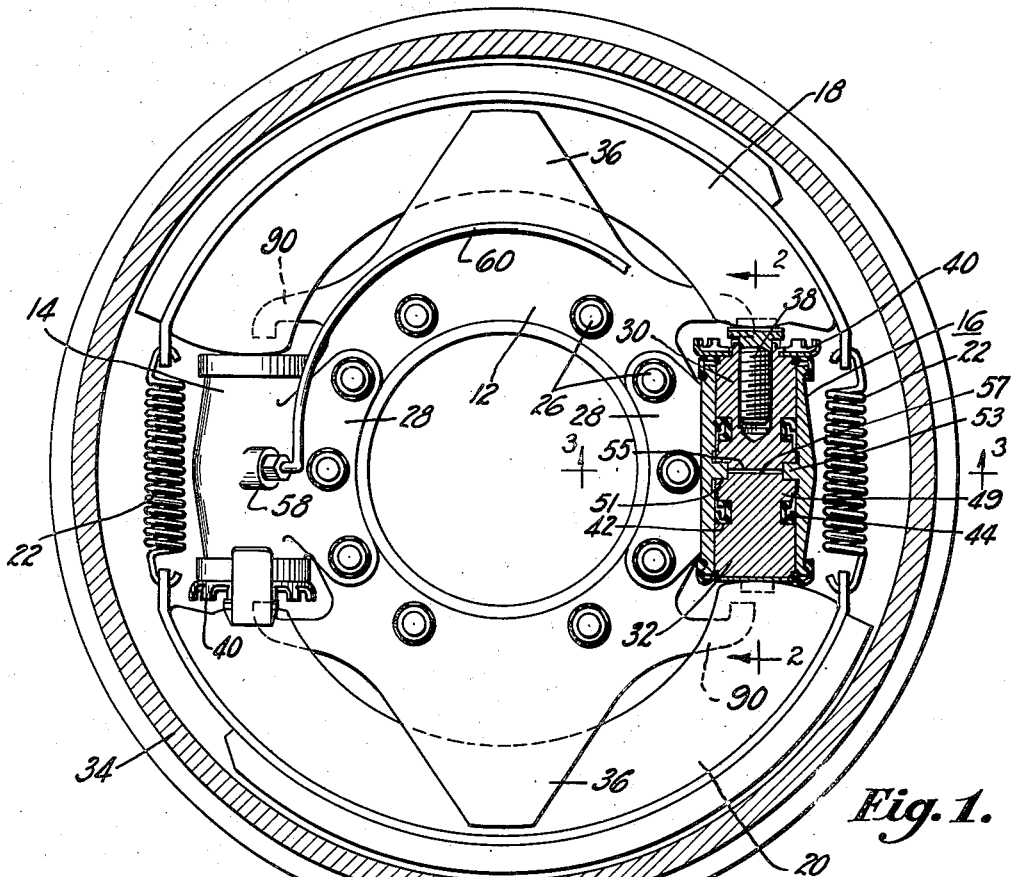
Figures 2, 3:
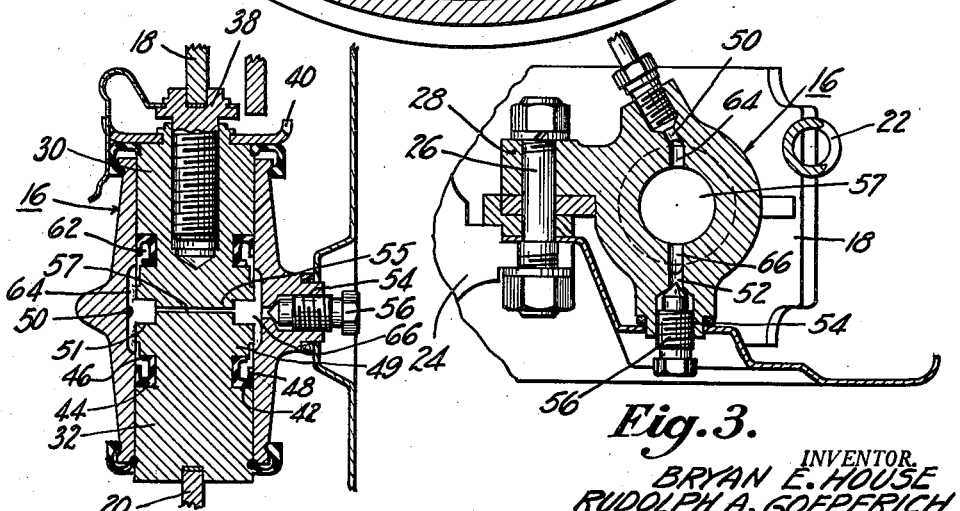

Other objects, features, and advantages of the present invention will become apparent during the course of the following description, reference being had therein to the accompanying drawings, in which:

Figure 1 is a side elevation of a brake which incorporates a version of the present invention;

Figures 2 and 3 are enlarged sections taken on the lines 2—2 and 3—3, respectively, of Figure 1;

Figure 4 is a partial side elevation showing the application of the principles of the present invention to a different brake; and Figures 5 and 6 are sections taken on the lines 5—5 and 6—6, respectively, of Figure 4.

The brake of Figures 1 to 3 includes a supporting plate or spider 12, a pair of hydraulic cylinders 14 and 16 carried by the spider, a pair of brake shoes 18 and 20, and two return springs 22 which urge the shoes toward released or retracted position. The spider is adapted to be secured to a non-rotating flange 24 by means of a plurality of bolts 26, and the cylinders 14 and 16 are secured to the spider (and, in the illustration, to flange 24 also) by means of flanges 28, which are integral with the cylinders, and which are bolted to the spider, as shown in Figure 3.

Each of the cylinders 14 and 16 has a pair of pistons 30 and 32 which are reciprocable therein and which are operatively associated with the ends of the shoes to exert applying force thereon. Outward movement of the pistons under the pressure of liquid which flows into the space between the pistons moves the shoes into frictional engagement with the rotating drum 34.

The shoes 18 and 20 are laterally positioned by engagement with radial arms 36 of the spider and by slots provided in the outer ends of the several pistons.

In order to adjust the released position of the shoes to compensate for wear, piston 30 in each cylinder is provided with an adjusting screw 38, axial movement of the adjusting screw being obtained by rotating the toothed wheel 40, which causes the piston to rotate.

The need for an improved bleeding arrangement arises from the provision of an annular peripheral groove 42 in each piston, for the purpose of retaining a sealing member 44. The groove 42, in each case, is spaced rearwardly or outwardly from the forward or inner end of the piston. Each sealing member 44 is annular in shape and, in cross-section, has an inner lip 46 and an outer lip 48, as shown.

The forward portion 49 of each piston, which lies ahead of the respective groove 42, has a shoulder 51 which is adapted to contact one side of the internal anchor ring or flange 53 of the cylinder. Contact of the shoulders 51 with flange 53 serves the dual function of transmitting the anchoring torque of the shoes to the cylinder and thence to the spider during braking, and of determining the released or retracted position of the pistons and shoes.

While the presence of the anchoring shoulder 51 on each piston necessitates positioning the sealing member intermediate the ends of the piston rather than on the face of the piston, and thereby complicates the bleeding problem, the value of the present invention is by no means limited to instances in which the pistons anchor on a centrally located internal flange. There are other important reasons why it is desirable to use an annular seal located in a groove in the outer cylindrical surface of the piston.

Positioning cup-shaped sealing members on the faces of the pistons has the inherent disadvantage that it requires the presence of a relatively large chamber in the center of the cylinder, and requires the presence of a relatively large volume of liquid in the cylinder. During braking, exceptionally high temperatures are developed in the brake assembly, heating and tending to boil the liquid in the wheel cylinders. The difficulty caused by excessive heat can be markedly reduced by reducing the amount of liquid in the cylinder to a minimum. This reduces the amount of liquid subject to vaporization, and increases the relative amount of liquid subject to the cooling influences in the conduits and other portions of the system not affected by brake heat. If a large amount of vapor is generated during an unusually severe application, a subsequent application, made before the vapor has liquefied, may cause failure due to the compressibility of the vapor.

An additional advantage derived from locating the seal behind the piston head lies in the fact that it permits use of a longer piston for a given length cylinder, thereby increasing the piston bearing area.

In any instance in which the seal is not located at the front of the piston, the present invention is useful, regardless of the manner in which the piston and/or shoe is anchored.

For bleeding purposes, in a hydraulic cylinder having its sealing means carried by grooves in the outer cylindrical surfaces of the pistons it is desirable that the pistons fill the interior of the cylinder as fully as possible. This is true because limitation or restriction of the space at the center of the cylinder improves bleeding of the device by forcing liquid through the annular seal-containing grooves during bleeding.

Referring to Figures 1 to 3, it will be seen that the inner ends of the pistons have reduced diameter extensions 55 which reduce the volume of the central chamber 57 of the cylinder to a minimum, the ends of extensions 55 preferably coming as close together in released position as is feasible from an efficient manufacturing standpoint. Where use is made of the present arrangement for providing sealing means for the pistons, the volume of the central chamber should be limited by providing pistons which substantially fill the interior of the cylinder. This applies if the pistons anchor on the outer ends of the cylinders, if they anchor through caps, or if the shoes anchor on the supporting plate without transmitting torque to the cylinders.

The inlet and outlet ports of each cylinder are so located as to deliver fluid to the space 57 between the pistons. Referring particularly to Figures 2 and 3, the inlet port of the cylinder is shown at 50, and the outlet port at 52. It will be noted that the outlet port is provided with an enlarged threaded opening 54, into which a bleed screw 56 is inserted. The bleed screw serves the purpose of plugging the opening until such time as it is desired to bleed the hydraulic system.

The fact that the particular cylinder shown in Figures 2 and 3 is provided with a bleed opening is of no particular significance insofar as the invention is concerned. In other words, the invention applies equally to a cylinder in which the outlet port is connected to a fluid line. The only fact of importance is that the cylinder is provided with an inlet port and an outlet port. Cylinder 14 has its inlet port (not shown) connected to the master cylinder, and its outlet port 58 connected to the conduit 60, which leads to the inlet port 50 of cylinder 16.

While the inlet and outlet ports should be connected to the space between the pistons (or to the space just ahead of the respective piston) and therefore should lie in or nearly in the same cross-sectional plane, as shown, the relative locations of the ports with respect to the circumference of the cylinder bore need not conform to the preferred arrangement shown, in which the ports are approximately diametrically opposite one another. If desired the ports may be brought closer together in the circumferential sense. However, for the best results in bleeding, it is considered desirable to have the paths traversed by the two diverging liquid streams approximately equal in length.

In order to provide relatively free communication between the inlet and outlet ports, on the one hand, and the annular pockets 62, on the other hand, the cylinder wall is cored out to form two longitudinally (or axially) extending passages 64 and 66, each of which communicates with one of the ports and with both of the annular pockets 62. In the cylinder shown, the passage 64 permits direct communication between the inlet port 50, on the one hand, and the left (as seen in Figure 2) side of the pockets 62, on the other hand. The passage 66 permits direct communication between the right side (Figure 2) of the pockets 62, on the one hand, and the outlet port 52, on the other hand.

The passages 64 and 66, which cut through both the flange 53 and the cylinder wall proper, are sufficiently large to permit relatively free communication between the ports and the annular pockets, as contrasted to the restricted flow of liquid through the chamber 57. The result is that the liquid during bleeding, tends to pass in the inlet port 50, through the passage 64, around the annular pockets 62, and out through the passage 66 and outlet port 52.

In the brake as a whole, the movement of the liquid during the bleeding operation is first through the cylinder 14, in exactly the manner described in the preceding paragraph, thence through conduit 60, and finally through cylinder 16. It is also possible to bleed by moving liquid in the reverse direction, i. e., through the bleed hole, thence through the system, and out at the master cylinder.

Figures 4 to 6, inclusive, show the application of the principles heretofore discussed to a hydraulic wheel cylinder 70, which has only a single piston 72, the hydraulic pressure being utilized to actuate a shoe which is self-energizing in one direction of drum rotation, and de-energizing in the other direction of rotation.

The inner end 74 of piston 72 substantially fills the interior of the cylinder, abutting the end wall of the cylinder in released position. Contact of the piston with the cylinder wall in this instance serves merely to determine the released position of the piston and of upper shoe 18a, there being no anchoring torque delivered through the piston (the lower shoe 20a anchors directly on the cylinder casing, as shown).

An annular groove 76 in the piston carries a sealing ring 78. The annular pocket 80 communicates with inlet port 82 by means of a passage 84 in the cylinder wall, and with outlet port 86 by means of a passage 88 in the cylinder wall. The brake arrangement shown in Figures 4 to 6 is intended for a front wheel, whereas the brake shown in Figures 1 to 3 is intended for a rear wheel, both being shown as brakes on the left side of the vehicle. Therefore, since the cylinder of Figures 4 to 6 is nearest the master cylinder, the inlet port 82 is connected to the master cylinder, and the outlet port 86 is connected to the other cylinder of the brake (not shown).

An interesting feature of the brakes of both Figures 1 and 4 is the provision of arms 90, integral with the spider, which extend outwardly into the paths of the respective pistons. In case of drum breakage, the arms 90 will prevent the pistons from popping out of the cylinders, thereby insuring against failure of the entire vehicle braking system.

Although a particular embodiment of our invention has been described, it will be understood by those skilled in the art that the object of the invention may be attained by the use of constructions different in certain respects from those disclosed without departing from the underlying principles of the invention. We therefore desire by the following claims to include within the scope of our invention all such variations and modifications by which substantially the results of our invention may be obtained through the use of substantially the same or equivalent means.

We claim:

1. In a fluid pressure cylinder having inlet and outlet ports located opposite one another, a piston having its forward end adjacent said ports and having an annular peripheral groove located intermediate its forward and rearward ends, an annular sealing member located in said groove, means for limiting the space forward of the piston to a relatively small volume, thereby limiting the amount of direct fluid flow between the inlet and outlet ports, a relatively large passage extending substantially parallel to the axis of the cylinder connecting the inlet port to the aforementioned annular peripheral groove, and a second relatively large passage extending substantially parallel to the axis of the cylinder connecting the outlet port to said annular peripheral groove.

2. In a fluid pressure cylinder having circumferentially spaced inlet and outlet ports, a piston having its forward end adjacent said ports and having an annular peripheral groove located intermediate its forward and rearward ends, an annular sealing member located in said groove, means for limiting the space forward of the piston to a relatively small volume, thereby limiting the amount of direct fluid flow between the inlet and outlet ports, a longitudinally extending passage connecting the inlet port to the aforementioned annular peripheral groove, and a second longitudinally extending passage connecting the outlet port to said annular peripheral groove.

3. A hydraulic wheel cylinder comprising a casing having a cylindrical bore, an annular internal piston-locating flange in said bore, two pistons each having a shoulder adapted normally to rest against said flange and each having an inwardly extending projection adapted to partially fill the space inside the flange, said pistons each having an annular groove in their peripheral cylindrical surfaces intermediate their inner and outer ends, a sealing ring in the annular groove of each piston, an inlet port in one side of the cylinder wall communicating with the space between the pistons, an outlet port in the other side of the cylinder wall communicating with the space between the pistons, said space being so limited as to restrict the free flow of liquid therethrough between the inlet and outlet ports, an axially extending passage in the cylinder wall connecting the inlet port directly to the grooves of the two pistons at one side thereof, and a second axially extending passage in the cylinder wall connecting the outlet port directly to the grooves of the two pistons at the other side thereof, the cross-sectional areas of said passages and grooves being sufficiently large to cause the major portion of liquid flowing from the inlet port to the outlet port to pass through said grooves.

4. A hydraulic cylinder comprising a casing having a cylindrical bore, an internal piston-locating flange in said bore, two pistons each having a shoulder adapted normally to rest against said flange and each having an inwardly extending projection adapted to partially fill the space inside the flange, said pistons each having an annular seal-containing groove in their peripheral cylindrical surfaces intermediate their inner and outer ends, an inlet port in one side of the cylinder wall communicating with the space between the pistons, an outlet port in the other side of the cylinder wall communicating with the space between the pistons, said space being so limited as to restrict the free flow of liquid therethrough between the inlet and outlet ports, an axially extending passage in the cylinder wall connecting the inlet port directly to the grooves of the two pistons at one side thereof, and a second axially extending passage in the cylinder wall connecting the outlet port directly to the grooves of the two pistons at the other side thereof, the cross-sectional areas of said passages and grooves being sufficiently large to cause the major portion of liquid flowing from the inlet port to the outlet port to pass through said grooves.

5. A hydraulic cylinder comprising a casing having a cylindrical bore, an internal piston-locating flange in said bore, two pistons each having a shoulder adapted normally to rest against said flange and each having an inwardly extending projection adapted to partially fill the space inside the flange, said pistons each having an annular seal-containing groove in their peripheral cylindrical surfaces intermediate their inner and outer ends, an inlet port in the cylinder wall communicating with the space between the pistons, an outlet port in the cylinder wall communicating with the space between the pistons, a passage in the cylinder wall connecting the inlet port directly to the grooves of the two pistons, and a second passage in the cylinder wall connecting the outlet port directly to said grooves of the pistons.

6. A hydraulic cylinder comprising a casing, two pistons in said casing constructed to substantially fill the same, said pistons each having a peripheral seal-containing groove intermediate their inner and outer ends, an inlet port in the cylinder wall communicating with the space at the inner end of the pistons, an outlet port in the cylinder wall communicating with the space at the inner end of the pistons, a longitudinally extending passage connecting the inlet port directly to the grooves of the two pistons, and a second longitudinally extending passage connecting the outlet port directly to said grooves of the pistons.

BRYAN E. HOUSE.
RUDOLPH A. GOEPFRICH.

REFERENCES CITED

The following references are of record in the file of this patent:

UNITED STATES PATENTS

| Number | Name | Date |
|---|---|---|
| 1,735,206 | Madden | Nov. 12, 1929 |
| 1,996,444 | Tatter | Apr. 2, 1935 |